(12) United States Patent
Yilma et al.

(10) Patent No.: US 11,091,023 B2
(45) Date of Patent: Aug. 17, 2021

(54) WHEEL ASSEMBLY

(71) Applicant: Ford Global Technologies, LLC, Dearborn, MI (US)

(72) Inventors: Benjamin Yilma, Canton, MI (US); Travis Justin Raines, Grosse Ile, MI (US); Pattrick Loew, Dearborn, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/320,662

(22) PCT Filed: Jul. 29, 2016

(86) PCT No.: PCT/US2016/044649
§ 371 (c)(1),
(2) Date: Jan. 25, 2019

(87) PCT Pub. No.: WO2018/022080
PCT Pub. Date: Feb. 1, 2018

(65) Prior Publication Data
US 2019/0160937 A1   May 30, 2019

(51) Int. Cl.
*B60K 7/00* (2006.01)
*B60L 50/60* (2019.01)
(Continued)

(52) U.S. Cl.
CPC ............ *B60K 7/0007* (2013.01); *B60L 50/64* (2019.02); *B60L 50/66* (2019.02); *B62K 3/002* (2013.01);
(Continued)

(58) Field of Classification Search
CPC ...... B60K 7/0007; B62K 5/027; B62K 3/002; B62K 2204/00; B60L 50/66; B60L 50/64; B60L 2220/44
See application file for complete search history.

(56) References Cited

U.S. PATENT DOCUMENTS

| 4,353,464 A | 10/1982 | Bentler |
| 5,732,786 A * | 3/1998 | Fujigaki ................. B60L 53/80 180/19.3 |

(Continued)

FOREIGN PATENT DOCUMENTS

| DE | 19962992 A1 | 7/2001 |
| EP | 0691232 A2 | 1/1996 |

(Continued)

OTHER PUBLICATIONS

Notification of Transmittal of the International Search Report and the Written Opinion of the International Search Authority regarding Application No. PCT/US2016/044649 dated Oct. 18, 2016 (12 pages).

(Continued)

*Primary Examiner* — Jacob B Meyer
(74) *Attorney, Agent, or Firm* — Brandon Hicks; Bejin Bieneman PLC

(57) ABSTRACT

A wheel assembly includes an attachment module, a motor module, a battery module, and a wheel. The wheel is rotatably coupled to the attachment module about a rotational axis of the wheel. The attachment module has a plurality of coupling elements, and the motor module and the battery module each releasably couple to one of the coupling elements. The wheel extends around the attachment, motor, and battery modules. The motor and battery modules are identically shaped in a direction along the rotational axis.

20 Claims, 10 Drawing Sheets

(51) Int. Cl.
*B60L 50/64* (2019.01)
*B62K 5/027* (2013.01)
*B62K 3/00* (2006.01)
*B62J 43/00* (2020.01)

(52) U.S. Cl.
CPC .......... *B62K 5/027* (2013.01); *B60L 2220/44* (2013.01); *B62J 43/00* (2020.02); *B62K 2204/00* (2013.01); *Y02T 10/70* (2013.01)

(56) References Cited

U.S. PATENT DOCUMENTS

| | | | |
|---|---|---|---|
| 6,321,863 B1 | 11/2001 | Vanjani | |
| 6,390,216 B1 * | 5/2002 | Sueshige | A63B 55/61 |
| | | | 180/65.51 |
| 7,466,049 B1 | 12/2008 | Vancea | |
| 7,828,101 B2 * | 11/2010 | Radtke | B60L 50/66 |
| | | | 180/206.5 |
| 8,151,924 B2 * | 4/2012 | Radtke | B62M 6/45 |
| | | | 180/206.1 |
| 8,480,367 B2 | 7/2013 | Nielsen | |
| 8,657,047 B2 | 2/2014 | Urabe et al. | |
| 8,960,354 B2 * | 2/2015 | Lin | B60L 50/30 |
| | | | 180/220 |
| 10,811,647 B2 * | 10/2020 | Gu | B60K 1/04 |
| 2003/0193264 A1 * | 10/2003 | Pyntikov | H02K 1/141 |
| | | | 310/254.1 |
| 2003/0213630 A1 * | 11/2003 | Pyntikov | B60L 50/64 |
| | | | 180/220 |
| 2004/0021437 A1 | 2/2004 | Maslov et al. | |
| 2010/0101879 A1 | 4/2010 | McVickers | |
| 2010/0173188 A1 | 7/2010 | Dhawan et al. | |
| 2012/0235530 A1 | 9/2012 | Moya et al. | |
| 2015/0246705 A1 | 9/2015 | Sharkan et al. | |
| 2015/0259020 A1 | 9/2015 | Hoffmann et al. | |
| 2016/0075175 A1 | 3/2016 | Biderman et al. | |
| 2016/0075177 A1 | 3/2016 | Biderman et al. | |
| 2016/0075226 A1 | 3/2016 | Biderman et al. | |
| 2016/0082772 A1 | 3/2016 | Biderman et al. | |

FOREIGN PATENT DOCUMENTS

| | | |
|---|---|---|
| EP | 1413046 A1 | 4/2004 |
| EP | 1446858 A2 | 8/2004 |
| EP | 1503933 A1 | 2/2005 |
| GB | 2531623 A | 4/2016 |
| WO | 03047071 A2 | 6/2003 |
| WO | 2004001949 A1 | 12/2003 |
| WO | 2011031686 A1 | 3/2011 |
| WO | 2015010634 A1 | 1/2015 |
| WO | 2015118309 A1 | 8/2015 |

OTHER PUBLICATIONS

European Search Report for EP16910743 as issued by the European Patent Office dated Feb. 7, 2020.

* cited by examiner

WHEEL ASSEMBLY

BACKGROUND

Many vehicles and devices include wheels and rely on human power for propulsion. Examples include strollers, wheelchairs, scooters, bicycles, garbage bins, wheelbarrows, lawnmowers, and so on. Some of these devices have powered versions as well, such as self-propelled lawnmowers. Some of these devices are bulky and inconvenient to transport.

BRIEF DESCRIPTION OF THE DRAWINGS

FIG. 2 is an exploded view of the wheel assembly of.

DETAILED DESCRIPTION

Figure 1:
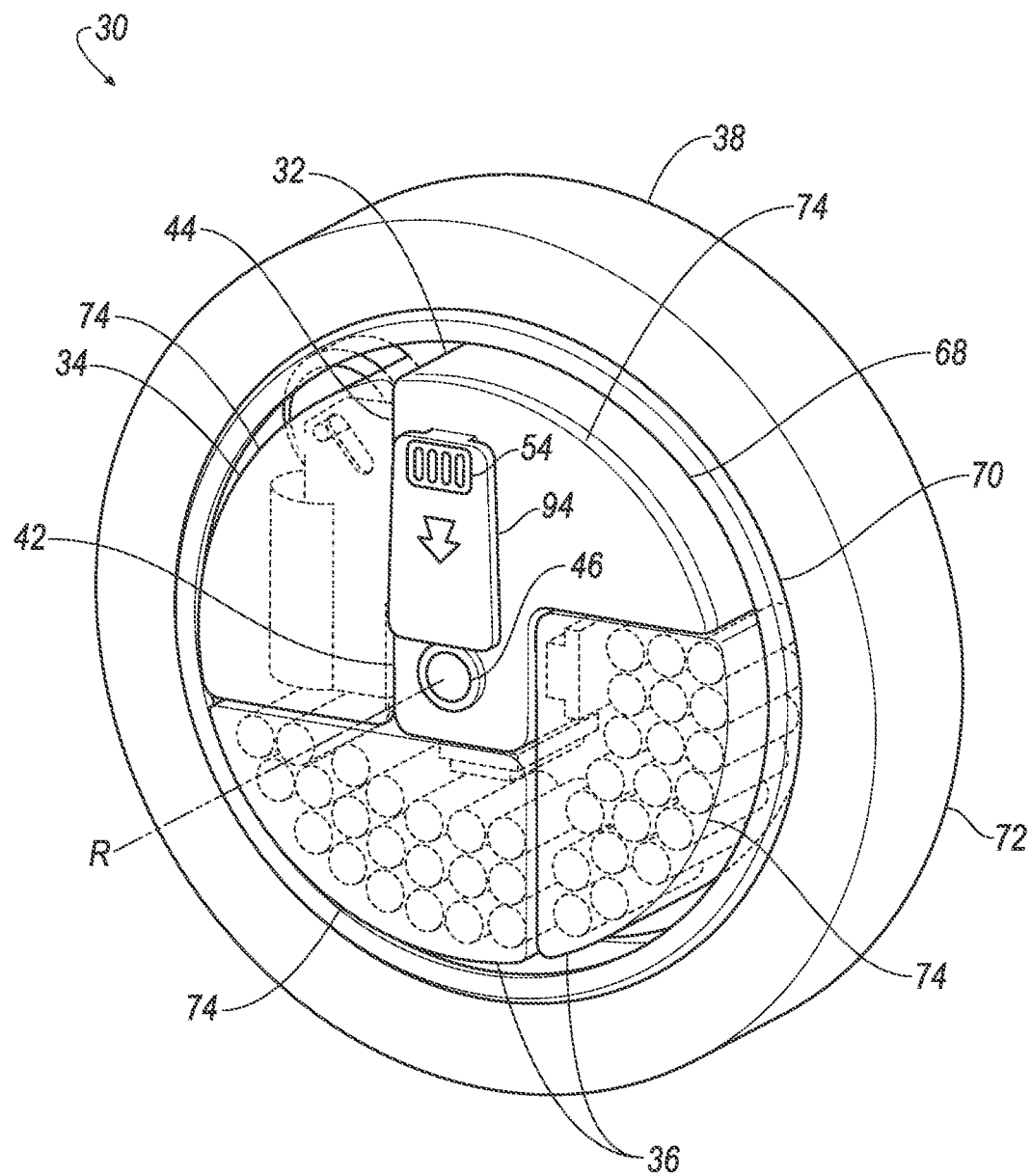
FIG. 1 is a perspective view of a wheel assembly.
Figure 2:
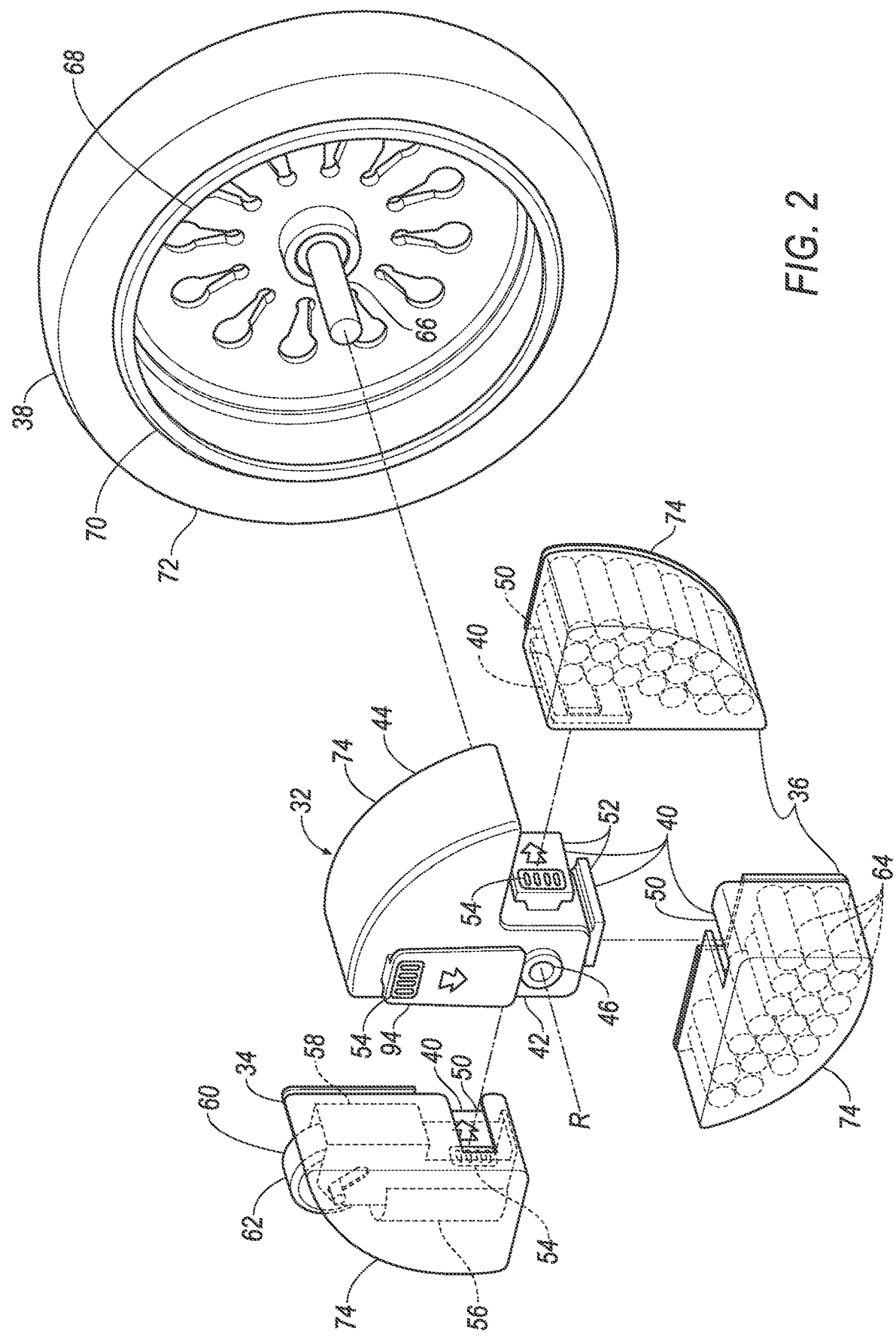

With reference to the Figures, wherein like numerals indicate like parts throughout the several views, a wheel assembly 30 includes an attachment module 32, a motor module 34, a battery module 36, and a wheel 38. The wheel 38 is rotatably coupled to the attachment module 32 about a rotational axis R of the wheel 38. The attachment module 32 has a plurality of coupling elements 40, and the motor module 34 and the battery module 36 each releasably couple to one of the coupling elements 40. The wheel 38 extends around the attachment, motor, and battery modules 32, 34, 36. The motor and battery modules 34, 36 are identically shaped in a direction along the rotational axis R.

The modularity and interchangeability of the motor and battery modules 34, 36 allows a user to use different combinations of the motor and battery modules 34, 36 for different purposes. The wheel assembly 30 can make a nonpowered wheeled device into a powered wheeled device. The wheel assembly 30 is compact and easily transported. The term "module" is used in connection with the attachment module 32, motor module 34, and battery module 36 refers to a hardware component including a casing, the coupling elements 40, electronics in the casing, etc.

Figure 3A:
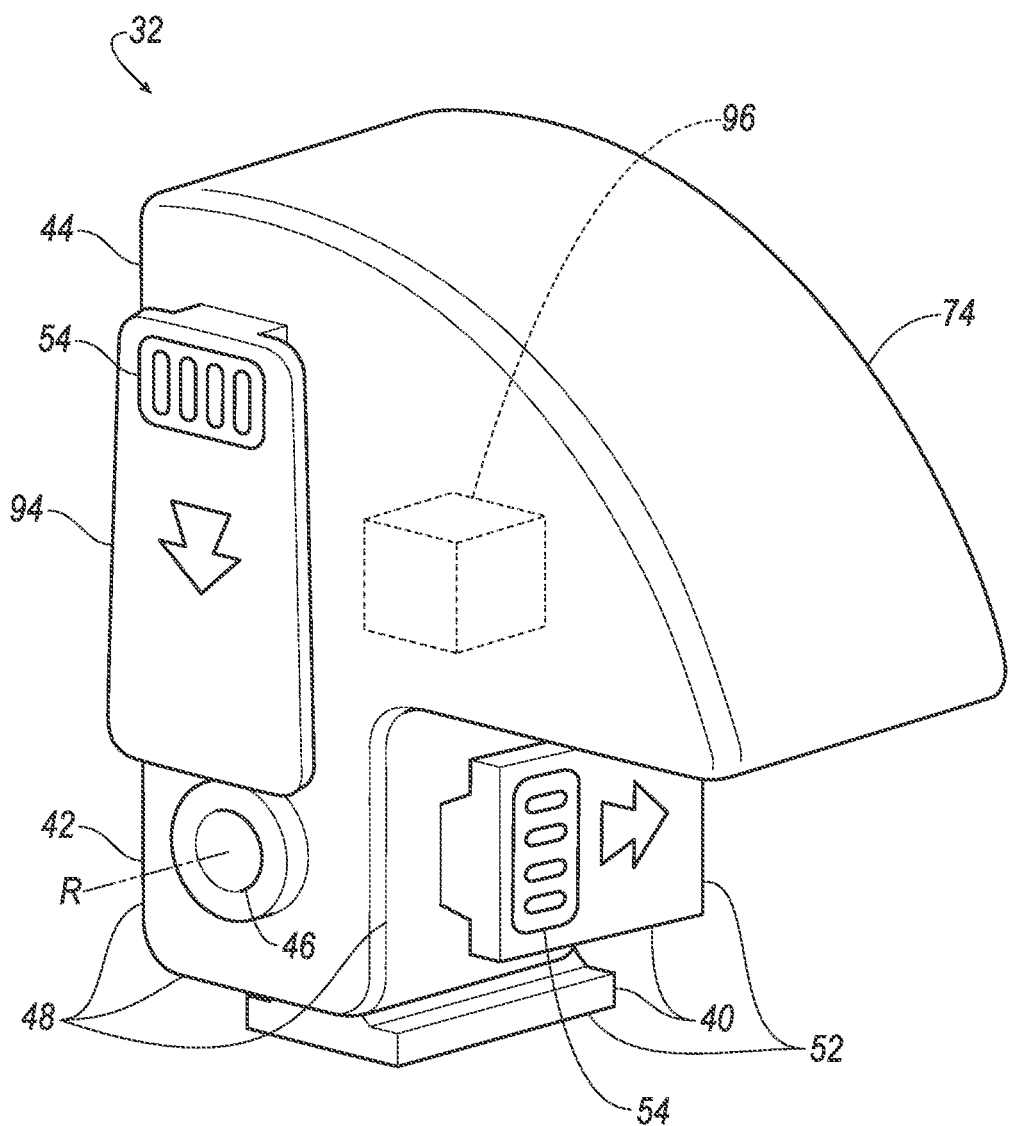
FIG. 3A is a perspective view of an attachment module of the wheel assembly.
Figure 3B:
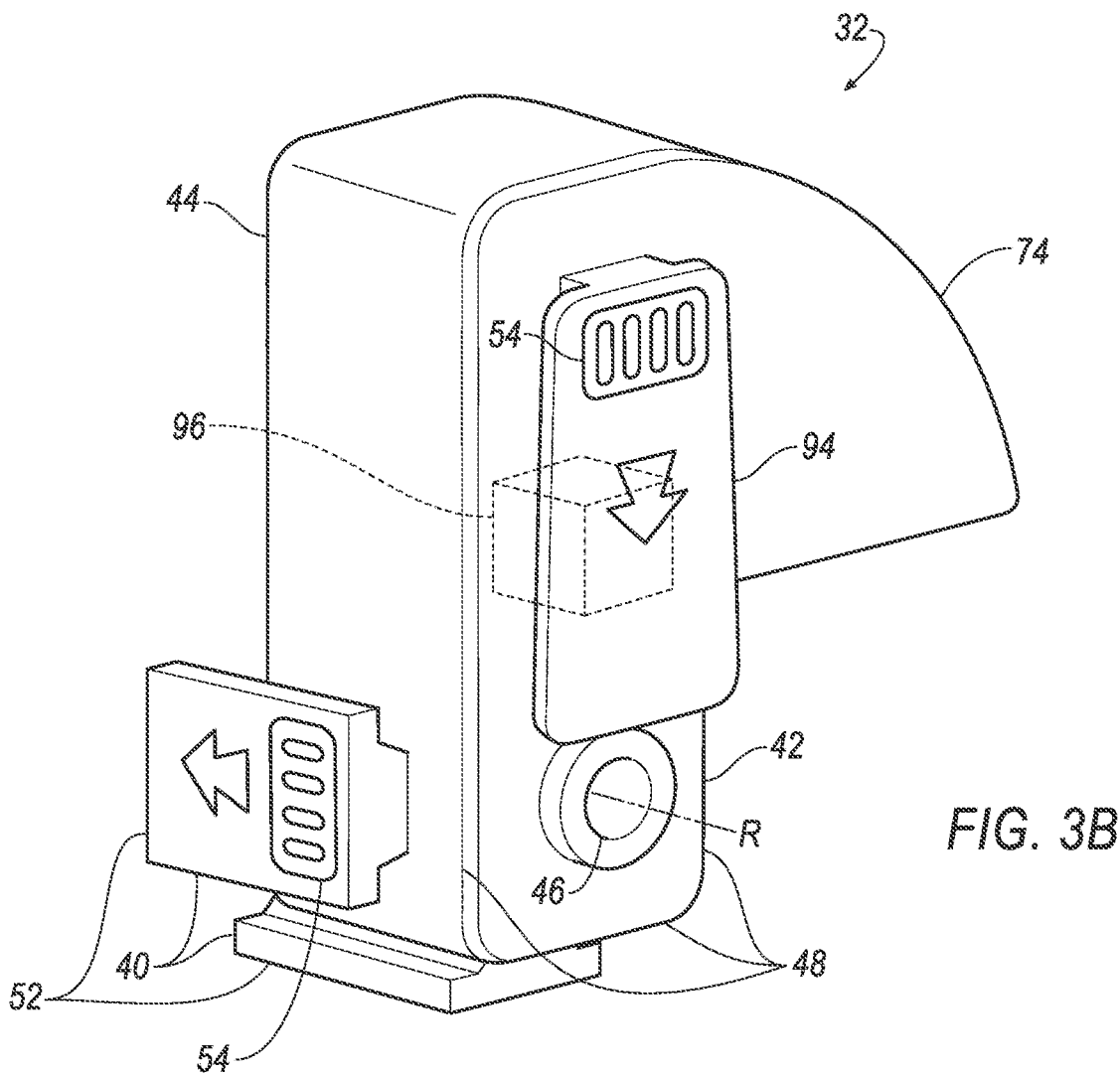
FIG. 3B is another perspective view of the attachment module.

With reference to FIG. 3, the attachment module 32 may have a center segment 42 and an extension segment 44. The attachment module 32 is configured to rotatably couple to the wheel 38 about the rotational axis R. Specifically, the attachment module 32 defines a bore 46 about the rotational axis R. The bore 46 may be disposed in the center segment 42. In the direction of the rotational axis R, the center segment 42 may have a square shape, with one side of the square shape attached or forming a single piece with the extension segment 44, and with three sides of the square shape forming faces 48 directed radially from the rotational axis R. The attachment module 32 has a plurality of coupling elements 40, for example, at least three coupling elements 40. The coupling elements 40 may be disposed on the faces 48 of the center segment 42.

Each coupling element 40 may include a slot 50 or a tongue 52 and an electrical connection 54 disposed in the slot 50 or on the tongue 52. The slot 50 may receive the tongue 52. The slot 50 and/or the tongue 52 may be tapered such that the slot 50 and the tongue 52 may be engaged with each other in a friction fit when the tongue 52 is received in the slot 50. In addition, or the alternative to the taper, the slot 50 may include, for example, a push lock or a friction detent to resist removal of the tongue 52 from the slot 50. Alternatively, the coupling element 40 may include any releasable attachment mechanism to resist removal of the tongue 52 from the slot 50. In the figures, for example, the attachment module 32 includes a plurality of tongues 52 and the motor and battery modules 34, 36 each include slots 50. Alternatively, the attachment module 32 may include any combination of slots 50 and/or tongues 52, and the motor and battery modules 34, 36 may include any combinations of slots 50 and/or tongues 52 for engaging the slots 50 and/or tongues 52 of the attachment module 32.

Figure 4:
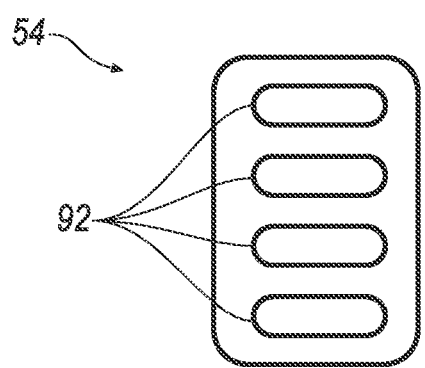
FIG. 4 is an electrical connection of the attachment module

With reference to FIG. 4, the electrical connection 54 may include a plurality of contacts 92. For example, the electrical connection 54 may include four contacts 92, two contacts 92 for signal input and output and two contacts 92 for power input and output.

With reference to FIG. 3, the attachment module 32 may include a control unit 96. The control unit 96 may be disposed in the extension segment 44 of the attachment module 32. The control unit 96 may be electrically connected to the electrical connections 54 of the coupling elements 40. If the motor and battery modules 34, 36 are attached to the coupling elements 40, the control unit 96 may be in electrical communication with the motor and battery modules 34, 36 through the coupling elements 40.

The control unit 96 may include a processor and a memory. The memory includes one or more forms of computer-readable media, and stores instructions executable by the processor for performing various operations, including those disclosed herein.

The control unit 96 may employ any of a number of computer operating systems, including, but by no means limited to, versions and/or varieties of the Ford SYNC® application, AppLink/Smart Device Link middleware, the MICROSOFT® Automotive operating system, the Microsoft WINDOWS® operating system, the Unix operating system (e.g., the SOLARIS® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems.

Computer-executable instructions stored on the memory, as set forth above, may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (which may also be referred to as a processor-readable medium) includes any non-transitory (e.g., tangible) medium that participates in providing data (e.g., instructions) that may be read by the control unit 96 (e.g., by the processor of the control unit 96). Such a medium may take many forms, including, but not limited to, non-volatile media and volatile media. Non-volatile media may include, for example, optical or magnetic disks and other persistent memory. Volatile media may include, for example, dynamic random access memory (DRAM), which constitutes a main memory. Such instructions may be transmitted by one or more transmission media, including coaxial cables, copper wire and fiber optics, including the wires that comprise a system bus coupled to the processor of the computer 20. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is included within a computing device employing a computer operating system such as one of those mentioned above, and are accessed via a network in any one or more of a variety of manners. A file system may be accessible from a computer operating system, and may include files stored in various formats. An RDBMS employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The attachment module 32 may include a connector 94 configured to releasably connect to a hub of a vehicle (examples of the vehicle are described further below). The connector 94 may be of the same configuration as the coupling elements 40, or the connector 94 may have a different configuration than the coupling elements 40.

Figure 5:
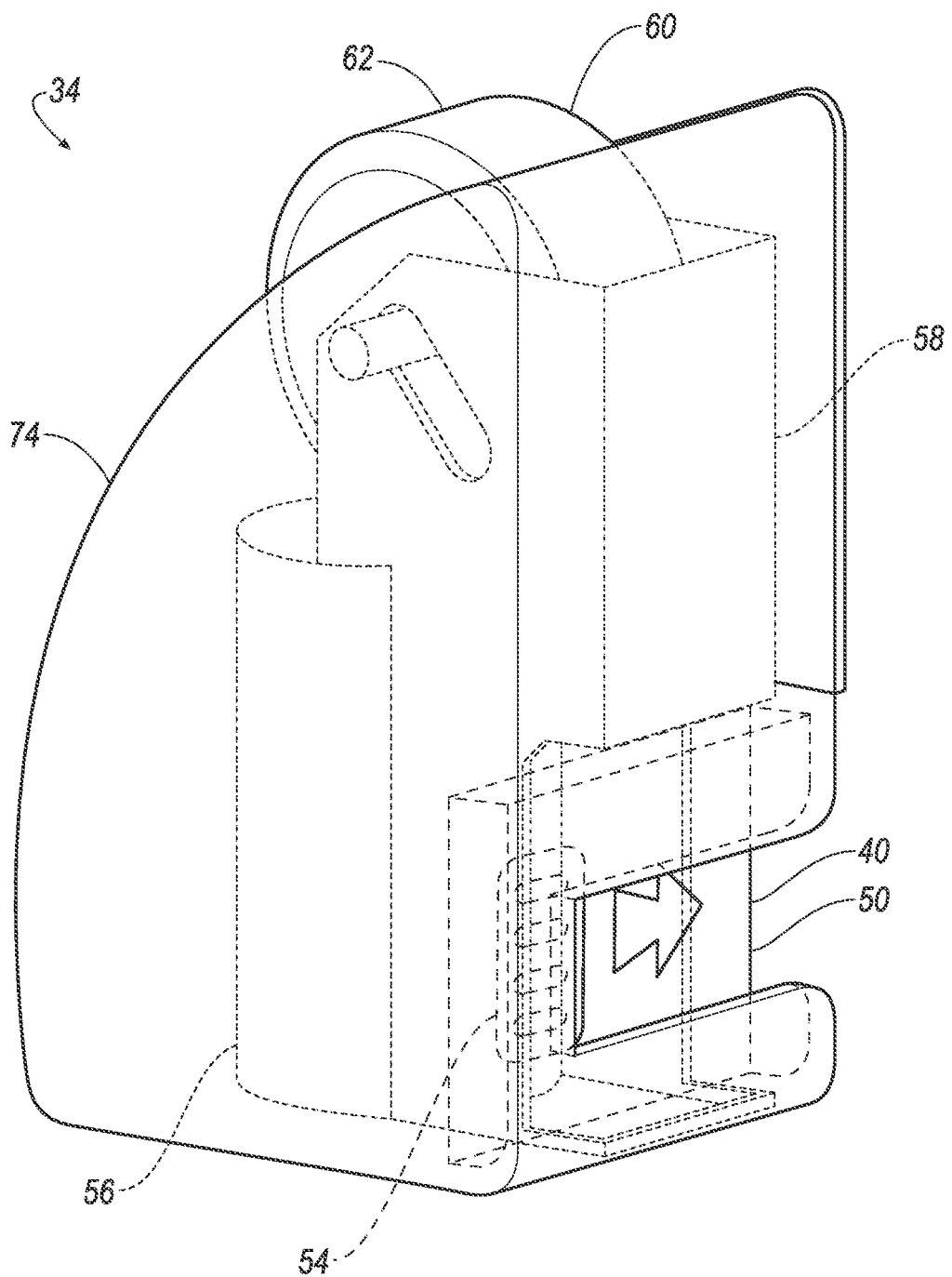
FIG. 5 is a motor module of the wheel assembly.

With reference to FIG. 5, the motor module 34 is configured to releasably couple to one of the coupling elements 40 of the attachment module 32. The motor module 34 may include a slot 50 to engage with the tongue 52 of the attachment module 32.

The motor module 34 may include a DC motor 56, a gearbox 58, and a roller 60. The DC motor 56 may be electrically connected to an electrical connection 54 on the tongue 52. The DC motor 56 may be mechanically connected to the gearbox 58 so that the DC motor 56 drives the gearbox 58. The gearbox 58 is mechanically connected to the roller 60, and the gearbox 58 transforms the input motion from the DC motor 56 to output motion rotating the roller 60. The roller 60 may be adjustable into and out of the motor module 34. The roller 60 may have a drive surface 62 in contact with the wheel 38 when the roller 60 is extended from the motor module 34.

Figure 6:
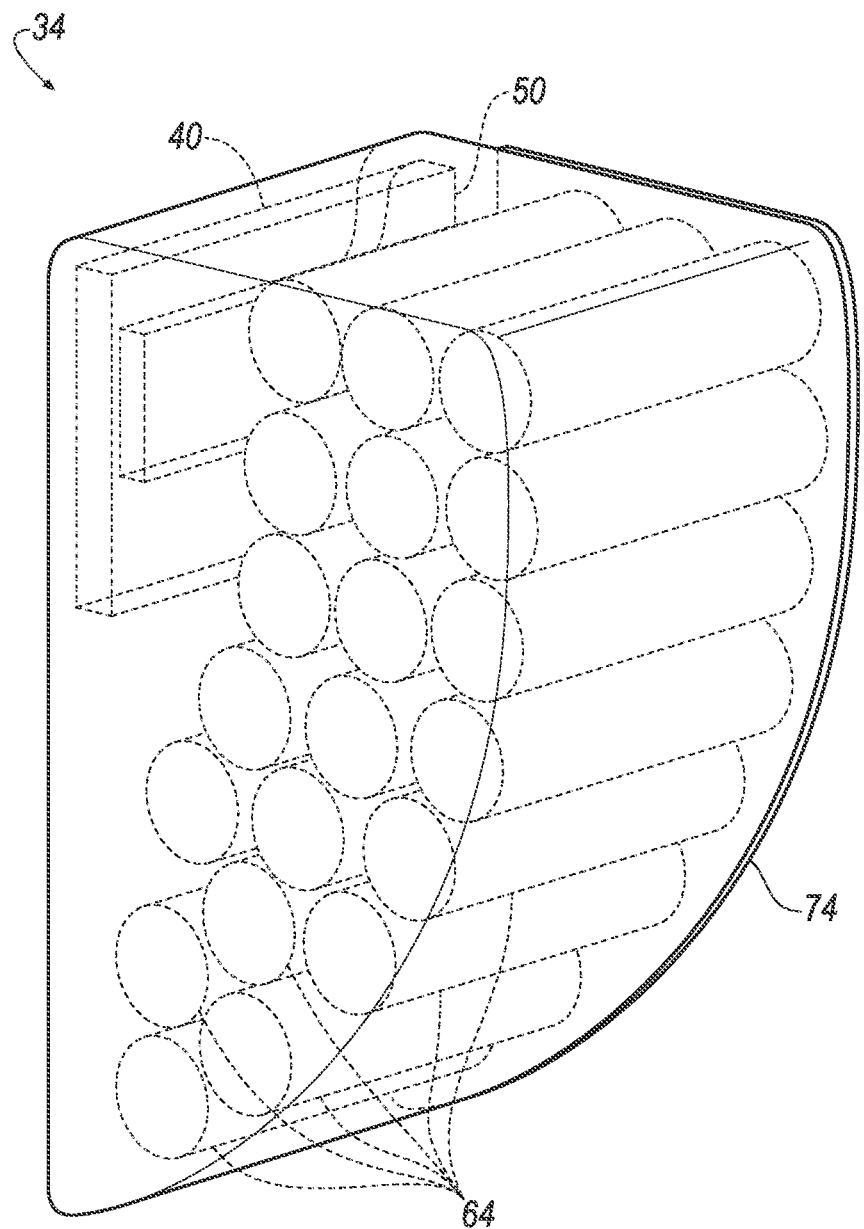
FIG. 6 is a battery module of the wheel assembly.

With reference to FIG. 6, the battery module 36 is configured to releasably couple to one of the coupling elements 40. The battery module 36 may include the slot 50 to engage with the tongue 52 of the attachment module 32. The battery module 36 includes a plurality of battery cells 64. The battery cells 64 may be lithium-ion battery cells, or the battery cells 64 may be of any suitable type for powering vehicular travel, for example, nickel-metal hydride batteries, lead-acid batteries, or ultracapacitors.

Figure 7:
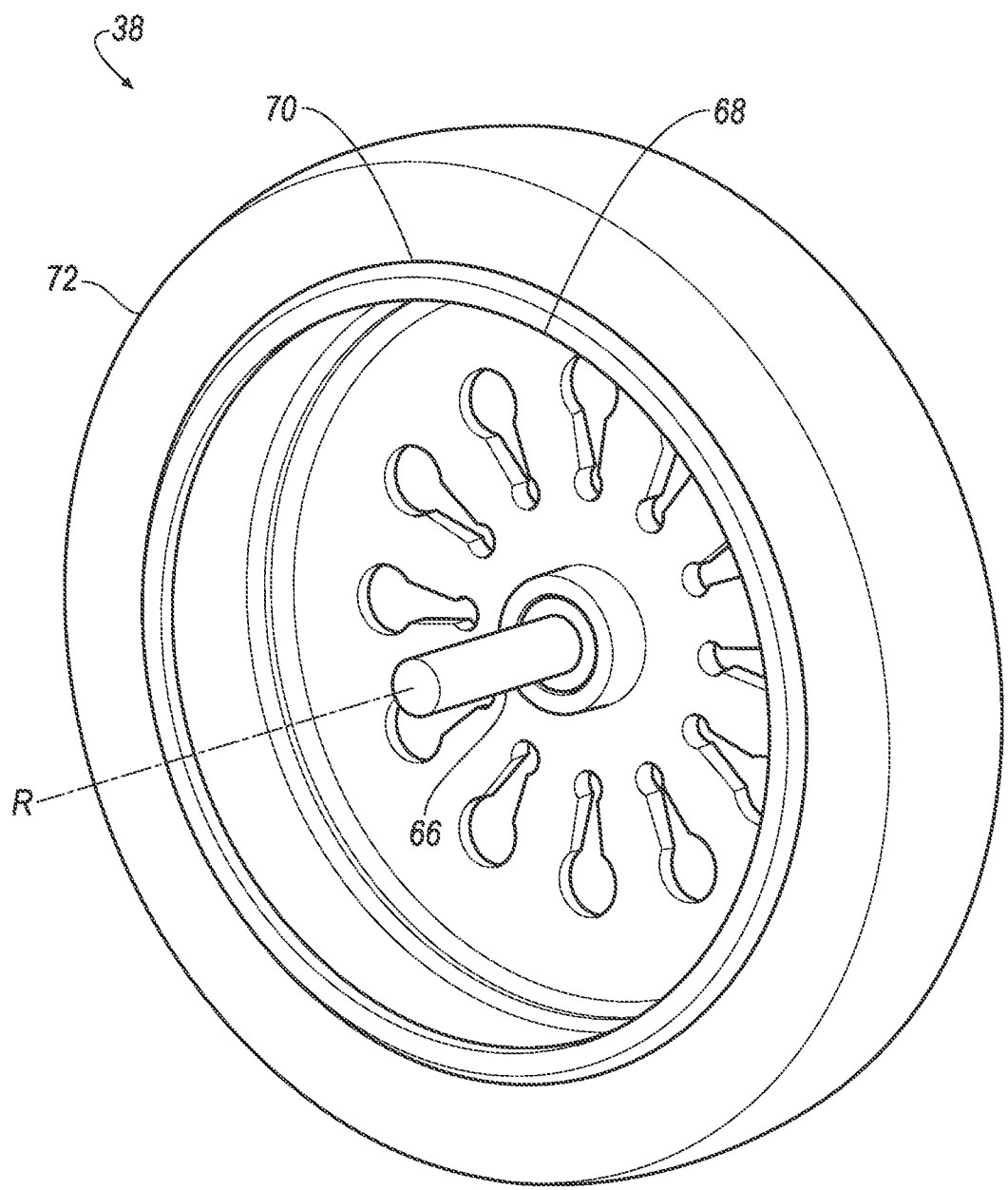
FIG. 7 is a wheel of the wheel assembly.

With reference to FIG. 7, the wheel 38 may be rotatably coupled to the attachment module 32 about the rotational axis R. Specifically, the wheel 38 may include a spindle 66 rotatably engaged with the bore 46. The wheel 38 may extend around the attachment, motor, and battery modules 32, 34, 36. Specifically, the wheel 38 may include a cavity 68 about the spindle 66 that receives the attachment, motor, and battery modules 32, 34, 36. The wheel 38 may include a rim 70 and a tire 72 extending around the rim 70, or the wheel 38 may be formed as a single piece.

The outer surfaces of the motor and battery modules 34, 36 are identically shaped in a direction along the rotational axis R when coupled to the attachment module 32. In other words, a silhouette or projection of the motor module 34 in a direction along the rotational axis R has the same two-dimensional shape as a silhouette or projection of the battery module 36 in a direction along the rotational axis R. Said differently, surfaces on the perimeter of the motor and battery modules 34, 36 that extend in a direction along the rotational axis R and circumferentially about the rotational axis R are identically shaped. More specifically, the motor and battery modules 34, 36 may each be identically shaped on all outer surfaces (with the exception of the roller 60). In this way, the motor and battery modules 34, 36 may be interchangeable with each other. The extension segment 44 of the attachment module 32 may be the identically shaped in a direction along the rotational axis R as the motor and battery modules 34, 36. The attachment, motor, and battery modules 32, 34, 36 are each configured to fit within the cavity 68 of the wheel 38.

The attachment, motor, and battery modules 32, 34, 36 may each include a curved surface 74 facing radially outward relative to the rotational axis R and extending circumferentially about the rotational axis R. The curved surfaces 74 may in combination encircle or partially encircle the rotational axis R. The curved surfaces of the attachment, motor, and battery modules 32, 34, 36 may be identical, i.e., may have the same radius and the same arc length.

The attachment, motor, and battery modules 32, 34, 36 are modular and may be assembled in the wheel 38 in different combinations. In a configuration where the attachment module 32 includes three coupling elements 40 on the faces 48 of the center segment 42, the wheel assembly 30 may include a combination of one, two, or three motor or battery modules 34, 36. For example, the wheel assembly 30 may include the attachment module 32, the motor module 34, the battery module 36, and one of a second motor module 34 and a second battery module 36. The wheel assembly 30 may include only the attachment module 32 and the battery module 36 in the wheel 38, which may be useful in a configuration where the attachment module 32 receives power from a vehicle to which the attachment module 32 is attached. The wheel assembly 30 may include the attachment module 32, one motor module 34, and one battery module 36 in the wheel 38, which may be a configuration for relatively lighter usage. The wheel assembly 30 may include the attachment module 32, one motor module 34, and two battery modules 36 in the wheel 38, which may be a configuration for relatively longer-range usage. The wheel assembly 30 may include the attachment module 32, two motor modules 34, and one battery module 36 in the wheel 38, which is a configuration for relatively higher-torque usage.

Figure 8:
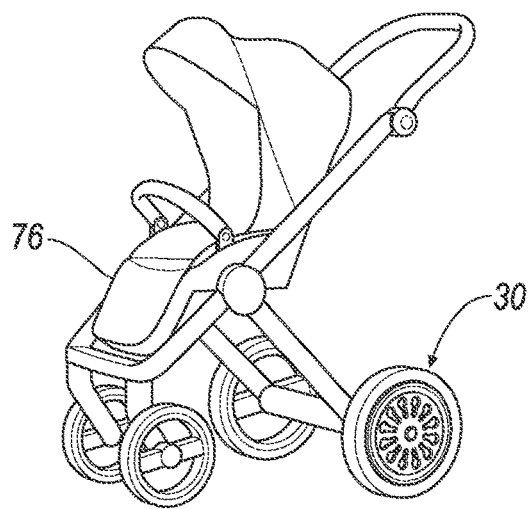
FIG. 8 is a stroller to which the wheel assembly is attached.
Figure 9:
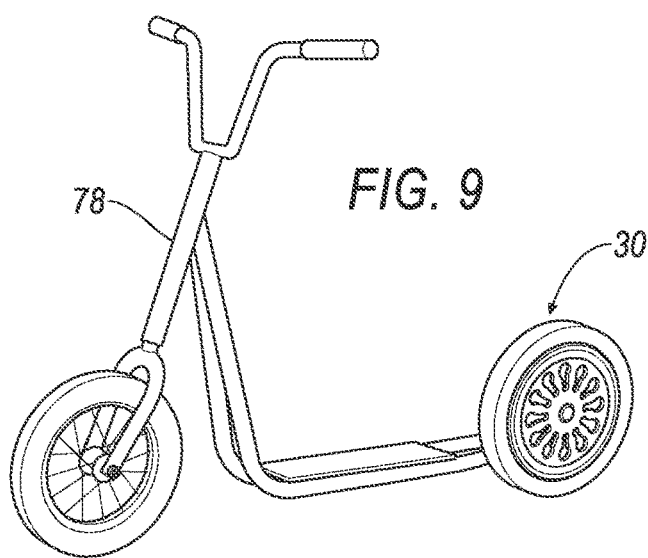
FIG. 9 is a scooter to which the wheel assembly is attached.
Figure 10:
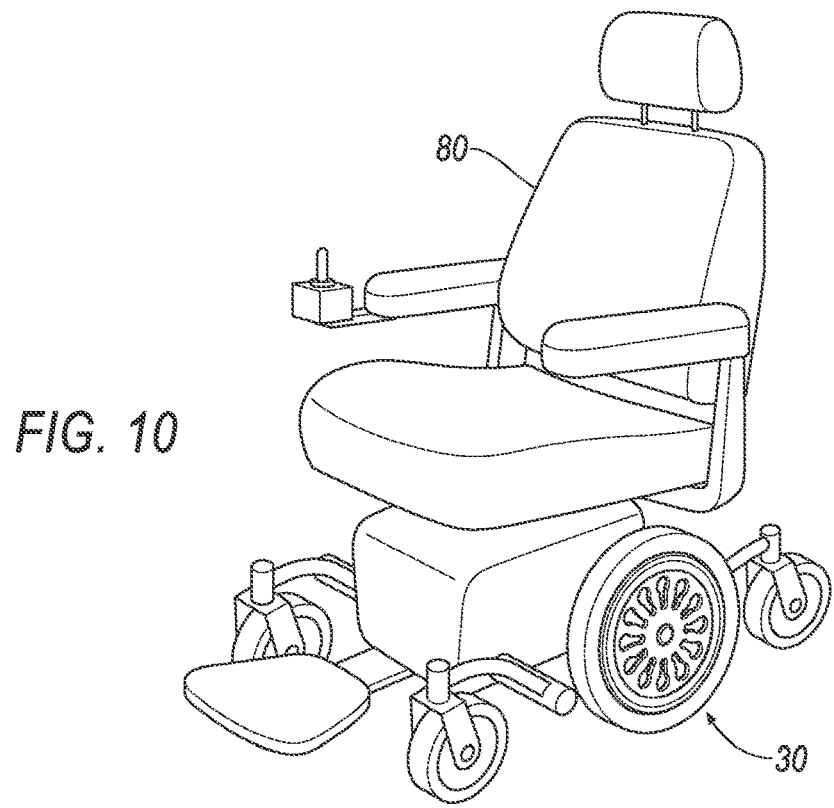
FIG. 10 is a wheelchair to which the wheel assembly is attached.

With reference to FIGS. 8-10, the wheel assembly 30 may be attached to a variety of wheeled vehicles or devices. For example, as shown in FIG. 8, the wheel assembly 30 may be attached to a stroller 76. The wheel assembly 30 may propel the stroller 76 forward, saving an individual from having to provide human-powered propulsion. For another example, as shown in FIG. 9, the wheel assembly 30 may be attached to a scooter 78, making the scooter 78 motorized. For yet another example, as shown in FIG. 10, the wheel assembly 30 may be attached to a wheelchair 80, saving an occupant of the wheelchair 80 from needing to propel the wheelchair 80 using arm-power, have another individual push the wheelchair 80, or buy or transport a motorized wheelchair, which can be expensive or bulky.

Figure 11:
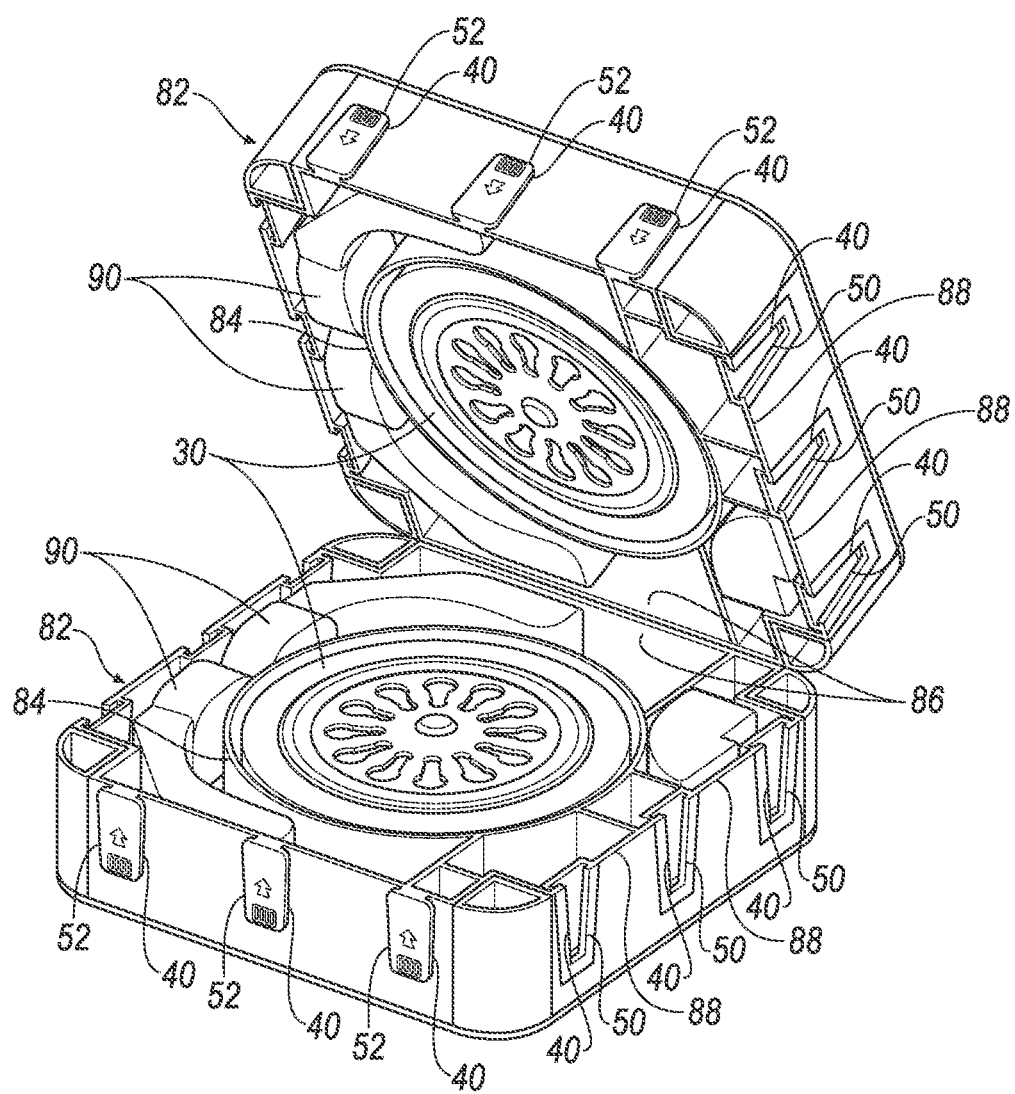
FIG. 11 is a perspective view of a case containing wheel assemblies.

Alternatively or additionally, with reference to FIG. 11, the wheel assembly 30 may be included in a kit. The kit may include one or two cases 82 and other components stored in the cases 82.

Each case 82 includes a chamber 84 configured to receive the wheel 38. The chamber 84 may have a circular shape with a diameter slightly larger than a diameter of the wheel 38. The case 82 may include a second chamber 86 configured to receive an elongated member 90, described below. The case 82 may include a third chamber 88 configured to receive one of the motor module 34 and the battery module 36. Two cases 82 may attach or fasten together to contain components stored within the chambers 84, 86, 88. The case 82 may be a rectangular prism in shape, or may have another shape. The case 82 may include a plurality of the coupling elements 40 disposed on exterior surfaces. The coupling elements 40 may have the same configuration as the coupling elements 40 of the attachment module 32. The case 82 may have at least three coupling elements 40. For example, the case 82 may have three coupling elements 40 with slots 50 and electrical connections 54 on two sides of the case 82 and three coupling elements 40 with tongues 52 and electrical connections 54 on two other sides of the case 82.

Figure 12:
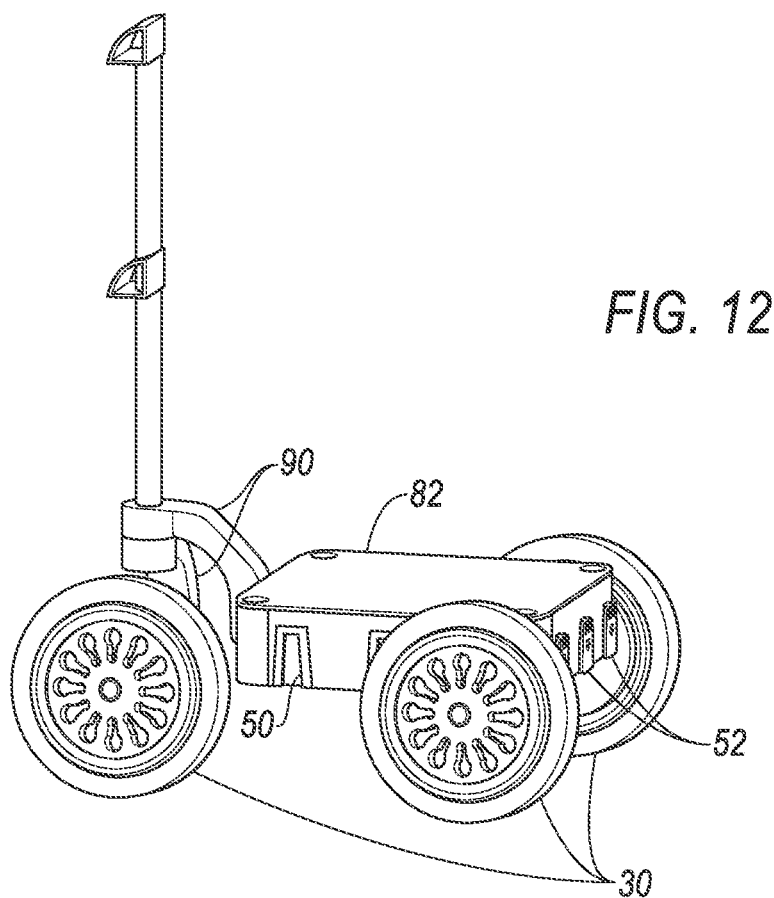
FIG. 12 is a modular assembly incorporating the case of FIG. 11 and the wheel assembly of FIG. 1.
Figure 13:
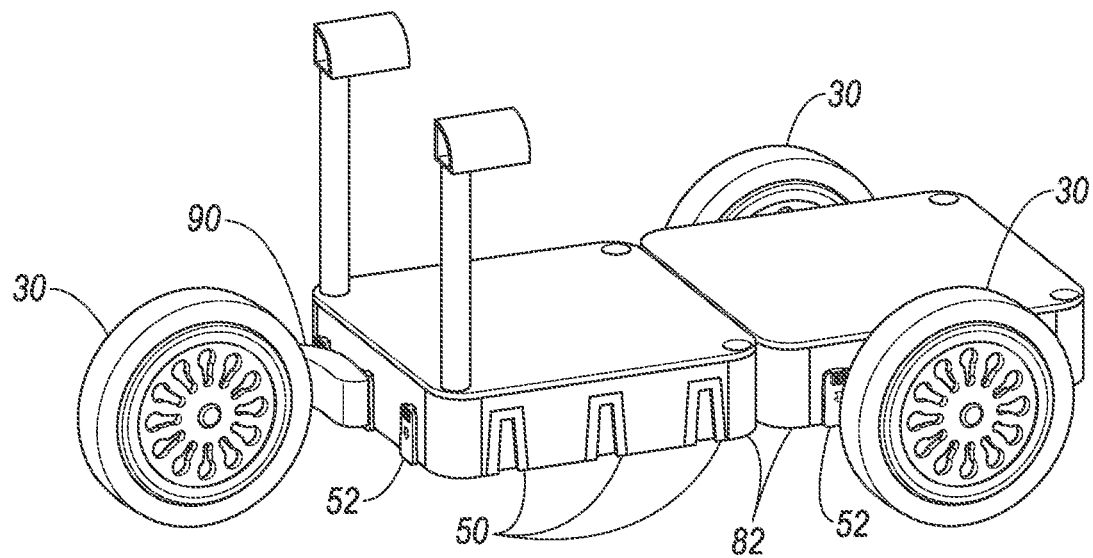
FIG. 13 is another modular assembly incorporating the case of FIG. 11 and the wheel assembly of FIG. 1.

The elongated member 90 may be configured to releasably couple to one of the coupling elements 40. For example, the elongated member 90 may include coupling elements 40 on each of two ends. The coupling elements 40 may include a slot 50 or tongue 52 and an electrical connection 54. The coupling elements 40 of the elongated member 90 may have the same configuration as the coupling elements 40 of the attachment module 32. The elongated member 90 may have an elongated shape that is curved, as shown in FIGS. 11-13, or straight.

The components in the kit may be assembled into modular assemblies. For example, as shown in FIG. 12, two wheel assemblies 30 are attached via the connectors to coupling elements 40 on two sides of one case 82, and two elongated members 90 attach another wheel assembly 30 to a third side of the case 82. For another example, as shown in FIG. 13, two cases 82 are attached together longitudinally, and two wheel assemblies 30 are attached to two sides of one of the two cases 82, and one wheel 38 is attached via one elongated member 90 to one side of the other case 82.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A wheel assembly comprising:
   an attachment module having a plurality of coupling elements;
   a motor module and a battery module each releasably coupled to one of the coupling elements; and
   a wheel rotatably coupled to the attachment module about a rotational axis of the wheel and extending around the attachment, motor, and battery modules; wherein
   the motor and battery modules are identically shaped in a direction along the rotational axis.

2. The wheel assembly of claim 1, wherein the plurality of coupling elements includes at least three coupling elements.

3. The wheel assembly of claim 2, further comprising one of a second motor module and a second battery module releasably coupled to one of the coupling elements and identically shaped to the motor and battery modules in the direction along the rotational axis.

4. The wheel assembly of claim 3, wherein the attachment, motor, and battery modules each include a curved surface facing radially outward relative to the rotational axis and extending circumferentially about the rotational axis, and wherein the curved surfaces in combination encircle the rotational axis.

5. The wheel assembly of claim 1, wherein each coupling element includes a tapered slot and an electrical connection disposed in the slot.

6. The wheel assembly of claim 1, wherein the motor module includes a roller with a drive surface in contact with the wheel.

7. The wheel assembly of claim 1, wherein the attachment module includes a control unit in electrical communication with the motor and battery modules through the coupling elements.

8. The wheel assembly of claim 1, wherein the motor and battery modules each includes a curved surface facing radially outward relative to the rotational axis and extending circumferentially about the rotational axis.

9. The wheel assembly of claim 1, wherein the attachment module includes a connector configured to releasably connect to a hub of a vehicle.

10. The wheel assembly of claim 1, wherein the attachment module defines a bore about the rotational axis and wherein the wheel includes a spindle rotatably engaged with the bore.

11. The wheel assembly of claim 10 wherein, the wheel includes a cavity about the spindle that receives the attachment, motor, and battery modules.

12. A wheel-assembly kit comprising:
a wheel having a cavity;
a case including a chamber configured to receive the wheel;
an attachment module configured to rotatably couple to the wheel about a rotational axis and having a plurality of coupling elements; and
a motor module and a battery module each configured to releasably couple to one of the coupling elements and fit within the cavity; wherein
the motor and battery modules are identically shaped in a direction along the rotational axis if coupled to the attachment module.

13. The wheel-assembly kit of claim 12, wherein the case includes a plurality of coupling elements identical to the coupling elements of the attachment module.

14. The wheel-assembly kit of claim 13, wherein the plurality of coupling elements of the case includes at least three coupling elements.

15. The wheel-assembly kit of claim 12, further comprising an elongated member configured to releasably couple to one of the coupling elements, wherein the case includes a second chamber configured to receive the elongated member.

16. The wheel-assembly kit of claim 12, wherein the case includes a second chamber configured to receive one of the motor module and the battery module.

17. The wheel-assembly kit of claim 12, further comprising a second case and a second wheel.

18. The wheel-assembly kit of claim 17, wherein the cases include a plurality of coupling elements identical to the coupling elements of the attachment module.

19. The wheel-assembly kit of claim 12, wherein the plurality of coupling elements includes at least three coupling elements.

20. The wheel-assembly kit of claim 19, further comprising one of a second motor module and a second battery module configured to releasably couple to one of the coupling elements and identically shaped to the motor and battery modules in the direction along the rotational axis if coupled to the attachment module.

* * * * *

UNITED STATES PATENT AND TRADEMARK OFFICE
CERTIFICATE OF CORRECTION

PATENT NO.        : 11,091,023 B2
APPLICATION NO.   : 16/320662
DATED             : August 17, 2021
INVENTOR(S)       : Yilma et al.

Page 1 of 1

It is certified that error appears in the above-identified patent and that said Letters Patent is hereby corrected as shown below:

In the Claims

Claim 11, Line 1:
Replace "claim 10 wherein, the wheel" with "--claim 10, wherein the wheel--"

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*